(12) United States Patent
Koganei

(10) Patent No.: US 9,128,534 B2
(45) Date of Patent: Sep. 8, 2015

(54) COMPUTER APPARATUS AND COMPUTER SYSTEM

(75) Inventor: Masayoshi Koganei, Tokyo (JP)

(73) Assignee: Sony Corporation, Tokyo (JP)

( * ) Notice: Subject to any disclaimer, the term of this patent is extended or adjusted under 35 U.S.C. 154(b) by 1421 days.

(21) Appl. No.: 11/926,965

(22) Filed: Oct. 29, 2007

(65) Prior Publication Data

US 2008/0122660 A1    May 29, 2008

(30) Foreign Application Priority Data

Nov. 24, 2006   (JP) .................. 2006-316415

(51) Int. Cl.
| H03K 17/94 | (2006.01) |
| G06F 3/023 | (2006.01) |
| G06F 1/16 | (2006.01) |
| G06F 1/26 | (2006.01) |

(52) U.S. Cl.
CPC ............... *G06F 3/0231* (2013.01); *G06F 1/16* (2013.01); *G06F 1/266* (2013.01); *G06F 2200/1631* (2013.01)

(58) Field of Classification Search
CPC ........................................................ G06F 1/16
USPC ................ 341/173, 20–23; 345/168, 172
See application file for complete search history.

(56) References Cited

U.S. PATENT DOCUMENTS

| 5,612,606 | A | * | 3/1997 | Guimarin et al. ............. 320/109 |
| 5,742,044 | A | * | 4/1998 | Battersby .................... 250/208.1 |
| 6,035,350 | A | * | 3/2000 | Swamy et al. ................. 710/73 |
| 6,133,833 | A | * | 10/2000 | Sidlauskas et al. ......... 340/572.1 |
| 6,138,050 | A | * | 10/2000 | Schneider et al. .............. 700/84 |
| 6,211,862 | B1 | * | 4/2001 | Park et al. ...................... 345/169 |
| 6,445,379 | B1 | * | 9/2002 | Liu et al. ........................ 345/163 |
| 6,480,372 | B1 | * | 11/2002 | Vong et al. ............... 361/679.09 |
| 7,006,014 | B1 | * | 2/2006 | Henty ............................. 341/22 |
| 7,223,250 | B2 | * | 5/2007 | Brattesani et al. .............. 601/46 |
| 7,245,223 | B2 | * | 7/2007 | Trela .......................... 340/573.1 |
| 7,364,070 | B2 | * | 4/2008 | Chang .......................... 235/383 |
| 7,749,447 | B1 | * | 7/2010 | Sauter, Jr. ..................... 422/504 |
| 7,883,458 | B2 | * | 2/2011 | Hamel ............................ 600/1 |
| 2002/0150214 | A1 | * | 10/2002 | Spahn ......................... 378/189 |
| 2004/0001307 | A1 | * | 1/2004 | Takakusaki .................. 361/683 |
| 2004/0005184 | A1 | * | 1/2004 | Kim et al. ..................... 400/472 |
| 2004/0127262 | A1 | * | 7/2004 | Ohno ........................... 455/566 |
| 2004/0203485 | A1 | * | 10/2004 | Lenchik et al. .............. 455/90.1 |
| 2004/0203513 | A1 | * | 10/2004 | Kwon ......................... 455/90.3 |
| 2005/0090768 | A1 | * | 4/2005 | Brattesani et al. .............. 601/70 |
| 2005/0143681 | A1 | * | 6/2005 | Brattesani et al. .............. 601/72 |
| 2005/0190061 | A1 | * | 9/2005 | Trela .......................... 340/573.1 |
| 2005/0230472 | A1 | * | 10/2005 | Chang .......................... 235/383 |
| 2005/0251228 | A1 | * | 11/2005 | Hamel ........................... 607/60 |
| 2006/0165463 | A1 | * | 7/2006 | Katz ............................. 400/472 |

FOREIGN PATENT DOCUMENTS

JP    4-243408    8/1992

OTHER PUBLICATIONS

Office Action issued Feb. 1, 2011, in Japanese Patent Application No. 2006-316415.

* cited by examiner

*Primary Examiner* — Amine Benlagsir
(74) *Attorney, Agent, or Firm* — Oblon, McClelland, Maier & Neustadt, L.L.P.

(57) ABSTRACT

A computer apparatus including: a reception unit adapted to wirelessly receive signals associated with key inputs transmitted from a keyboard; an attachment unit capable of attaching the keyboard; and a power transfer unit adapted to transfer power in a non-contact manner to a battery incorporated in the keyboard if the keyboard is attached to the attachment unit.

14 Claims, 12 Drawing Sheets

FIG.7A
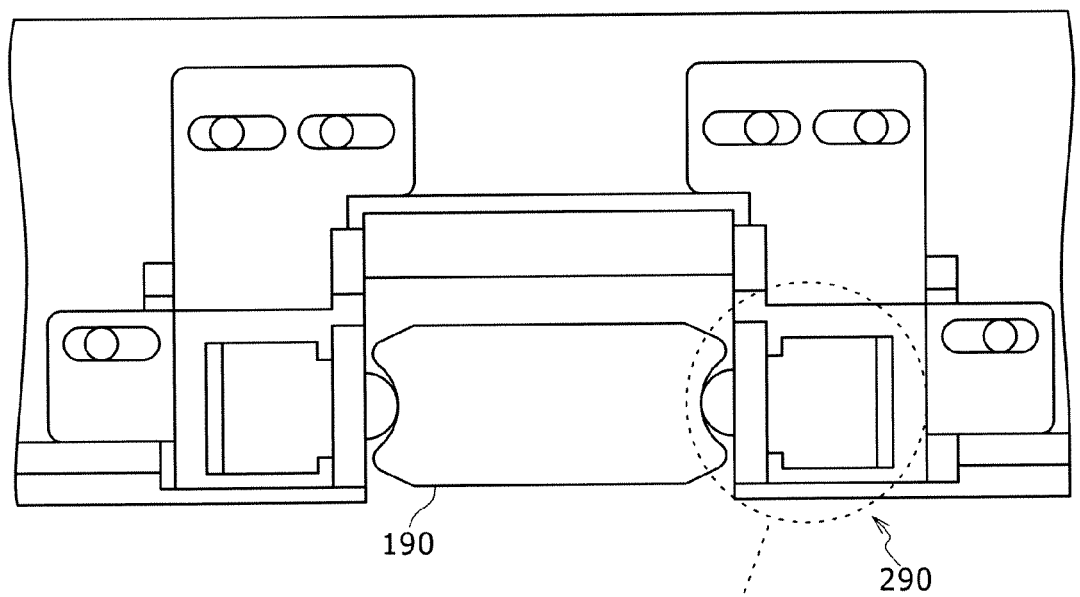
190  290
FIG.7B
MOVING DIRECTION OF THE
PROTRUDING PORTION
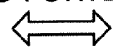
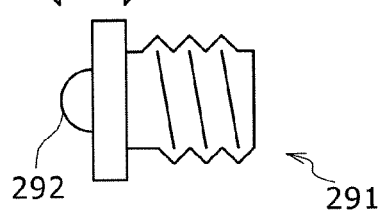
292  291

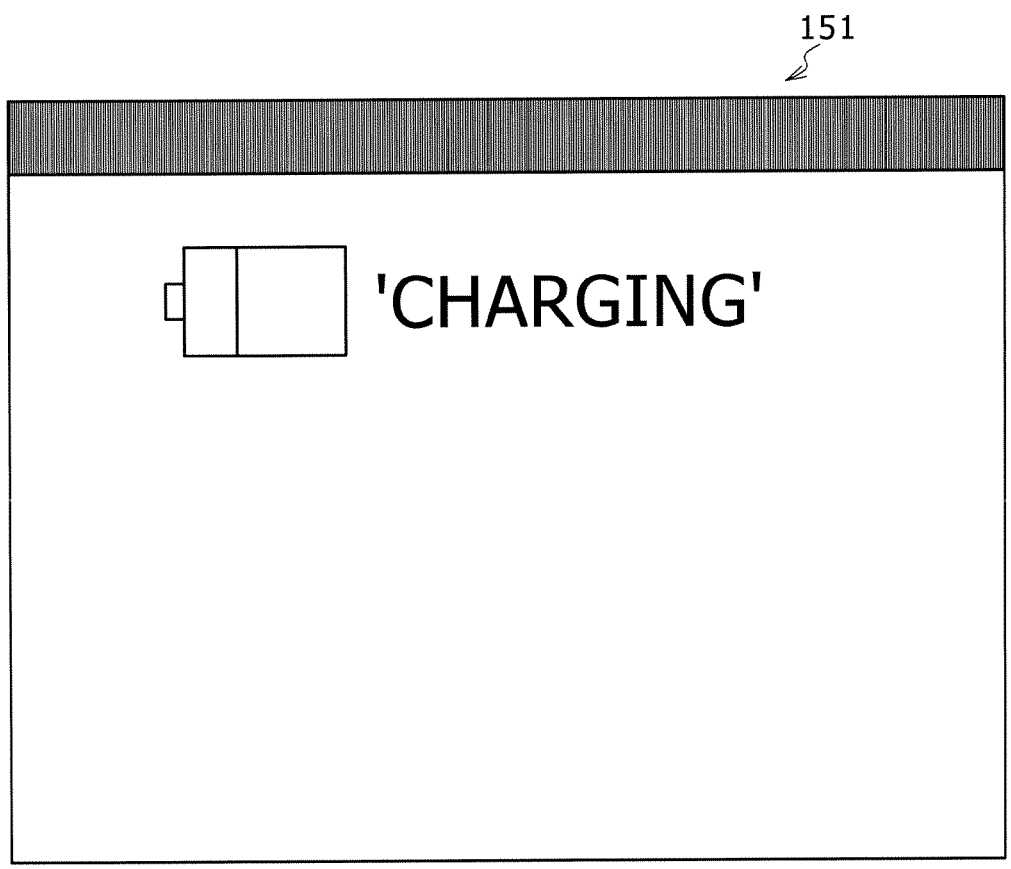

COMPUTER APPARATUS AND COMPUTER SYSTEM

CROSS REFERENCES TO RELATED APPLICATIONS

The present invention contains subject matter related to Japanese Patent Application JP 2006-316415 filed with the Japan Patent Office on Nov. 24, 2006, the entire contents of which being incorporated herein by reference.

BACKGROUND OF THE INVENTION

1. Field of the Invention

The present invention relates to a computer system and particularly to a computer system in which signals are wirelessly exchanged between a keyboard and a computer apparatus.

2. Description of the Related Art

In a computer system, a keyboard serves as a basic input device to input characters. The keyboard is often connected to a computer apparatus via a wired interface such as PS/S (Personal System/2) or USB (Universal Serial Bus).

In contrast, computer systems have been proposed recently which transfer input signals from the keyboard to the computer apparatus via an infrared or other wireless interface rather than a wired interface (e.g., Japanese Patent Laid-Open No. 1996-286791 (FIG. 1)).

SUMMARY OF THE INVENTION

To establish a connection between the keyboard and the computer apparatus via a wireless interface, a power supply is required not only for the computer apparatus but also for the keyboard. In the above-mentioned prior art, the keyboard includes a battery. The battery is charged by bringing the keyboard terminal in contact with the main body of the computer apparatus.

However, if contact power transfer is used in which the terminals are caused to touch each other, it is far from easy to maintain the contact area in a proper contact condition, often resulting in contact failure. In particular, if key input operations are performed with the keyboard attached to the main body, this applies a load to the contact area, making the contact condition more likely to change. Further, if the keyboard is movable in such a manner as to be folded into the main body, the contact area is prone to wear.

In light of the above, it is desirable to charge a keyboard through no medium of any contact between the keyboard and a computer apparatus main body.

The present invention has been devised to solve the above problem. A first embodiment of the present invention is a computer apparatus. The computer apparatus includes a reception unit adapted to wirelessly receive signals associated with key inputs transmitted from a keyboard. The computer apparatus further includes an attachment unit capable of attaching the keyboard. The computer apparatus still further includes a power transfer unit adapted to transfer power in a non-contact manner to a battery incorporated in the keyboard if the keyboard is attached to the attachment unit. This allows the keyboard battery to be charged in a non-contact manner with the keyboard attached to the computer apparatus.

In the first embodiment, the power transfer unit may control power transfer to the battery according to the keyboard attachment condition. This allows the battery charging to be controlled according to the keyboard attachment condition. It should be noted that among possible keyboard attachment conditions are whether or not the keyboard is attached and whether or not it is folded.

Further, in the first embodiment, the power transfer unit may control power transfer to the battery according to the type of program run by the computer apparatus. This allows the battery charging to be controlled according to the type of program run by the computer apparatus.

Still further, in the first embodiment, the attachment unit may be members adapted to support the keyboard rotatably around a given side of the keyboard. In this case, the computer apparatus may further include a detection unit adapted to detect the rotational status of the keyboard so that the power transfer unit control power transfer to the battery according to the rotational status of the keyboard. At this time, the power transfer unit may control power transfer in such a manner that power is transferred when the keyboard rotational status satisfies a given condition and not if the keyboard is in any other condition. In particular, the power transfer unit may transfer power to the battery when the keyboard is folded and not if the keyboard is in any other condition.

Still further, in the first embodiment, the computer apparatus may further include an indication unit adapted to indicate that the battery is being charged while the power transfer unit transfer power to the battery. This allows the user to be informed that the battery is being charged.

A second embodiment of the present invention is a keyboard. The keyboard includes a transmission unit adapted to wirelessly transmit signals associated with key inputs to a computer apparatus. The keyboard further includes a battery to supply power to the transmission unit. The keyboard still further includes an attachment unit capable of attaching the keyboard to the computer apparatus. The keyboard still further includes a power transfer unit adapted to receive power in a non-contact manner to the battery from the computer apparatus if the keyboard is attached to the computer apparatus with the attachment unit. This allows the keyboard battery to be charged in a non-contact manner from the computer apparatus (main body).

A third embodiment of the present invention is a computer system. The computer system includes a keyboard adapted to incorporate a battery and wirelessly transmit signals associated with key inputs. The computer system further includes a reception unit adapted to receive the signals from the keyboard. The computer system still further includes an attachment unit capable of attaching the keyboard. The computer system still further includes a power transfer unit adapted to transfer power in a non-contact manner to the keyboard battery if the keyboard is attached to the attachment unit. This allows the keyboard battery attached to the computer apparatus to be charged in a non-contact manner.

BRIEF DESCRIPTION OF THE DRAWINGS

FIGS. 7A and 7B are enlarged views of an example of attachment sections in the embodiment of the present invention;

FIG. 8 is a view illustrating an example of a 'charging' indication;

DETAILED DESCRIPTION OF THE PREFERRED EMBODIMENT

The present invention provides an outstanding effect of charging a keyboard through no medium of any contact between the keyboard and a computer apparatus main body.

A preferred embodiment of the present invention will be described below with reference to the accompanying drawings.

Figure 1:
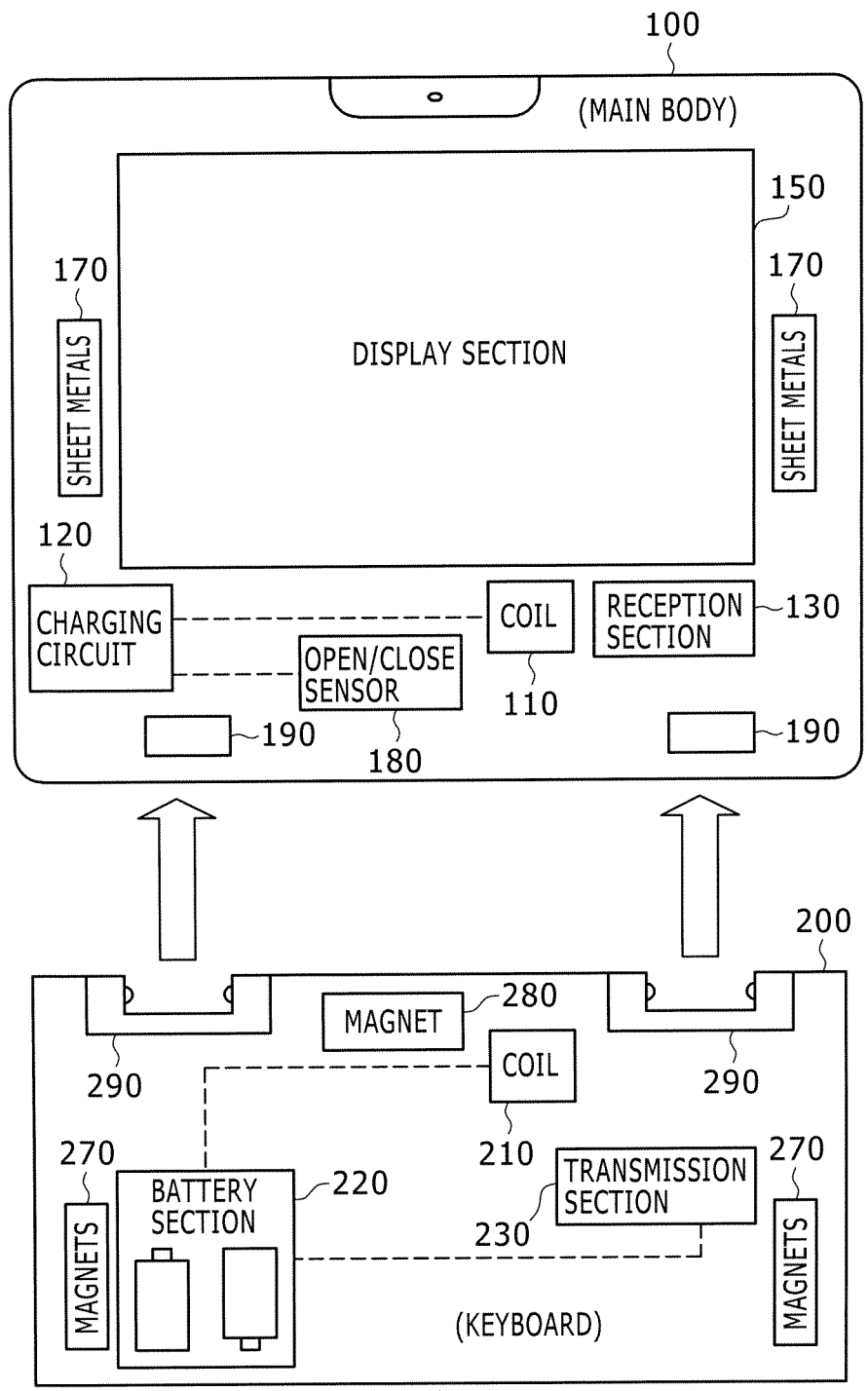
FIG. 1 is a view illustrating an example of overall configuration of a computer system according to an embodiment of the present invention.

FIG. 1 is a view illustrating an example of overall configuration of a computer system according to an embodiment of the present invention. The computer system includes a computer apparatus (main body) 100 and a keyboard 200. The computer apparatus 100 includes a coil 110, a charging circuit 120, a reception section 130, a display section 150, sheet metals 170, an open/close sensor 180 and attachment sections 190. The keyboard 200 includes a coil 210, a battery section 220, a transmission section 230, magnets 270 and 280 and attachment sections 290.

The keyboard 200 includes keys which are not shown. The keyboard 200 generates signals associated with key inputs. The transmission section 230 wirelessly transmits signals associated with key inputs. Signals can be transmitted, for example, using infrared radiation or radio wave.

The battery section 220 supplies power required for the operation of the transmission section 230 provided in the keyboard 200. The battery section 220 receives power from the computer apparatus 100 via the coil 210 to charge its battery.

The attachment sections 290 are members attached to the computer apparatus 100. Plungers, for example, can be used as the attachment sections 290. The magnets 270 are provided to maintain the keyboard 200 folded by a magnetic force acting between the magnets 270 and the sheet metals 170 of the computer apparatus 100 when the keyboard is attached to the computer apparatus 100 by means of the attachment sections 290. On the other hand, the magnet 280 applies a magnetic force to the open/close sensor 180 of the computer apparatus 100. This allows the open/close sensor 180 to detect the rotational status of the keyboard 200.

In the computer apparatus 100, the charging circuit 120 is provided to charge the battery section 220 of the keyboard 200. The charging circuit 120 has the coil 110 connected thereto, thereby allowing non-contact power transfer between the coil 110 of the computer apparatus 100 and the coil 210 of the keyboard 200.

The reception section 130 receives signals from the transmission section 230 of the keyboard 200. The display section 150 displays information according to processing performed by the computer apparatus 100.

The attachment sections 190 are members to which the attachment sections 290 of the keyboard 200 are attached. When plungers are used as the attachment sections 290, the keyboard 200 is rotatable around the attachment sections 190. The sheet metals 170 are provided to be attracted by the magnets 270 of the keyboard 200 by their magnetic force when the keyboard 200 is folded, thus maintaining the keyboard in a folded position. It should be noted that although a case has been described where the sheet metals 170 are provided on the computer apparatus 100, magnets may be provided in place of the sheet metals 170.

The open/close sensor 180 is designed to detect the rotational status of the keyboard 200 attached to the attachment sections 190. The open/close sensor 180 detects the magnetic force applied by the magnet 280 to determine whether the keyboard is folded. It should be noted that although a case has been described here where a magnetic force is used, a mechanical stress can also be used to detect the opening and closing of the keyboard.

Figure 2:
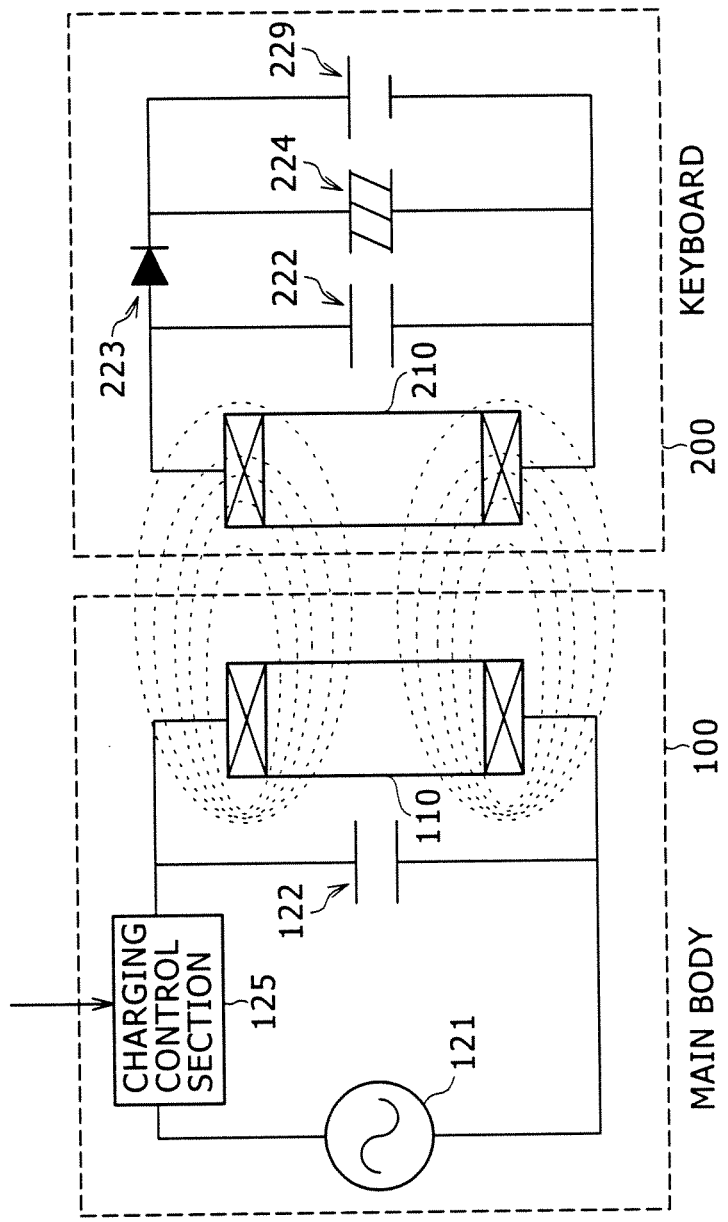
FIG. 2 is a view illustrating a configuration example relating to charging of a computer system in the embodiment of the present invention.

FIG. 2 is a view illustrating a configuration example relating to charging of the computer system in the embodiment of the present invention. As described above, the computer apparatus 100 transfers power to the keyboard 200 in a non-contact manner via the coils 110 and 210.

The computer apparatus 100 includes not only the coil 110 but also a power supply 121, a capacitor 122 and a charging control section 125 as the charging circuit 120. The capacitor 122 is provided to achieve resonance and supplies power from the power supply 121 to the coil 110.

The charging control section 125 controls the operation of the charging circuit 120. The same section 125 can control whether to perform charging according to the rotational status of the keyboard 200 detected by the open/close sensor 180. For example, when the keyboard 200 attached to the attachment sections 190 is not folded, it is possible that signals from key inputs may be transmitted from the transmission section 230. Therefore, charging may be performed only when the keyboard 200 is folded. On the other hand, charging may be performed when the computer apparatus 100 runs a specific application program (e.g., DVD reproduction software) with which no key inputs take place under a normal condition, even if the keyboard 200 is not folded. Preferably, these settings are selectable by the user, for example, via a menu screen.

The keyboard 200 includes not only the coil 210 but also capacitors 222 and 224, a diode 223 and a battery 229 as the battery section 220. The capacitor 222 is provided to achieve resonance. The diode 223 rectifies a voltage induced in the coil 210. The capacitor 224 smoothes out the voltage induced in the coil 210. The battery 229 is charged via these circuits. A lithium-ion or nickel-hydrogen battery, for example, is used as the battery 229.

Figure 3:
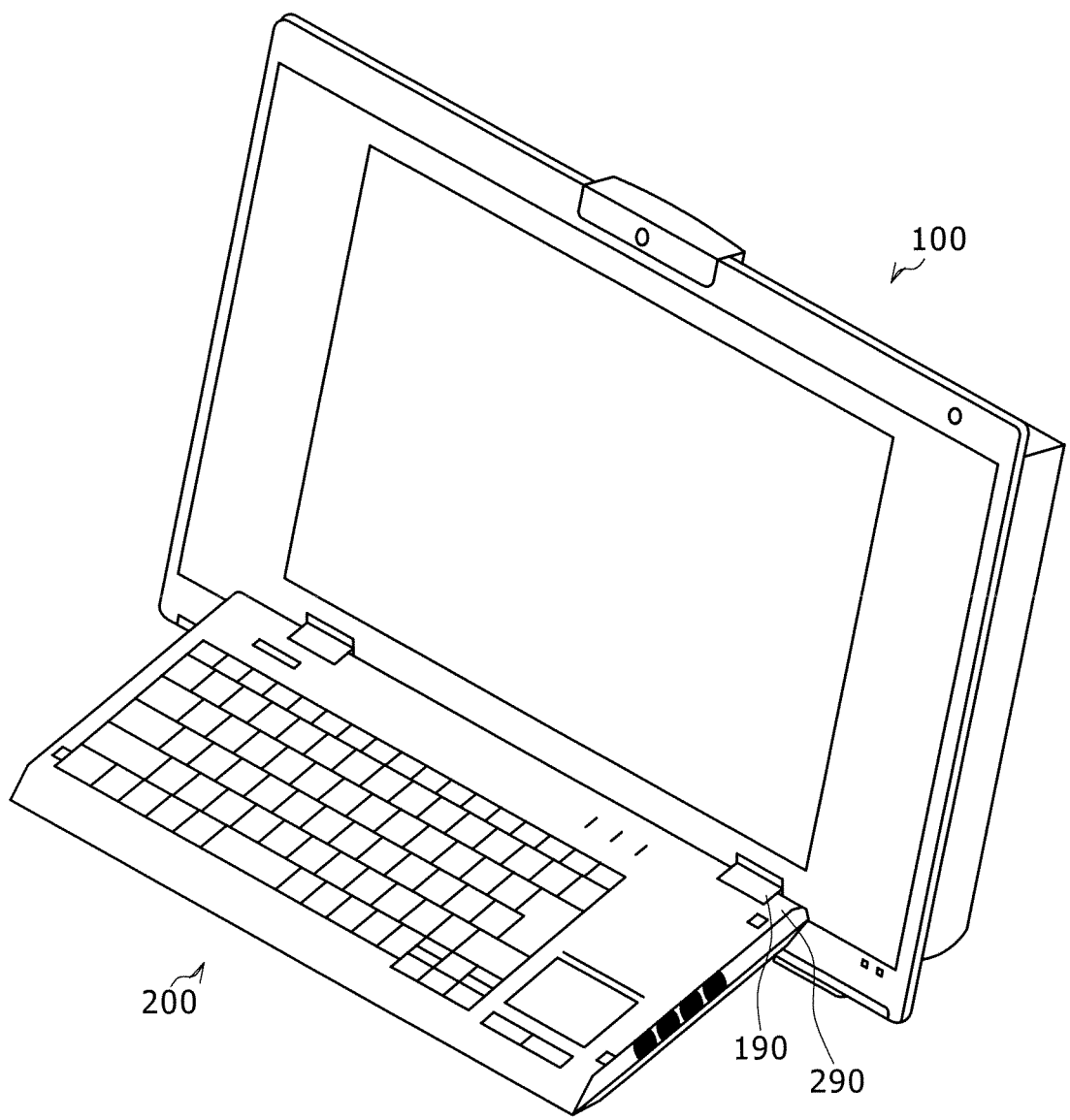
FIG. 3 is a perspective view illustrating an example of a keyboard as attached to a computer apparatus in the embodiment of the present invention.

FIG. 3 is a perspective view illustrating an example of a keyboard 200 as attached to the computer apparatus 100 in the embodiment of the present invention. In this example, the attachment sections 290 of the keyboard 200 are attached to the attachment sections 190 of the computer apparatus 100. Although rotatable around the attachment sections 190, the keyboard 200 is shown here to be unfolded.

Figure 4:
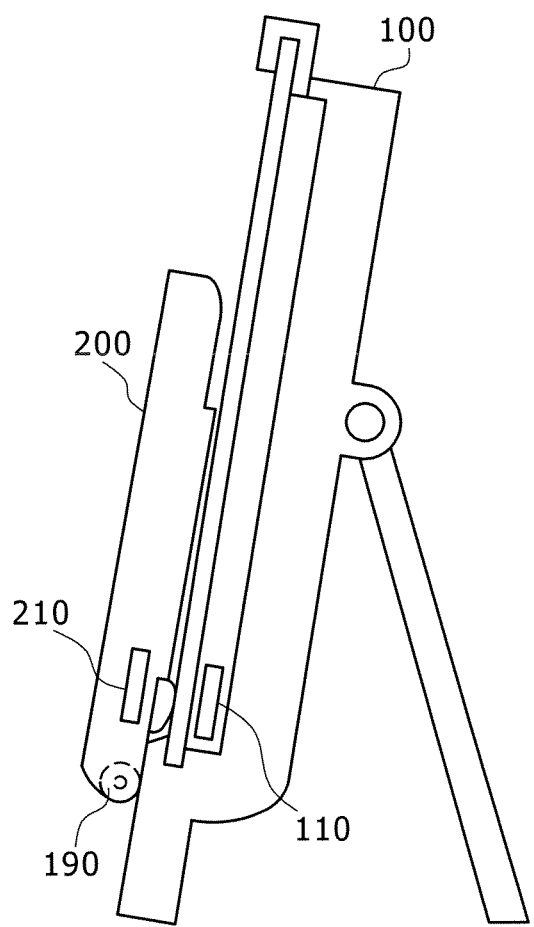
FIG. 4 is a side view illustrating an example of the keyboard as attached to the computer apparatus in the embodiment of the present invention.

FIG. 4 is a side view illustrating an example of the keyboard 200 as attached to the computer apparatus 100 in the embodiment of the present invention. In this example, the keyboard 200 is shown to be rotated around the attachment sections 190 into a folded position.

The coil 110 of the computer apparatus 100 and the coil 210 of the keyboard 200 are in proximity with each other. This allows for non-contact power transfer.

Figure 5:
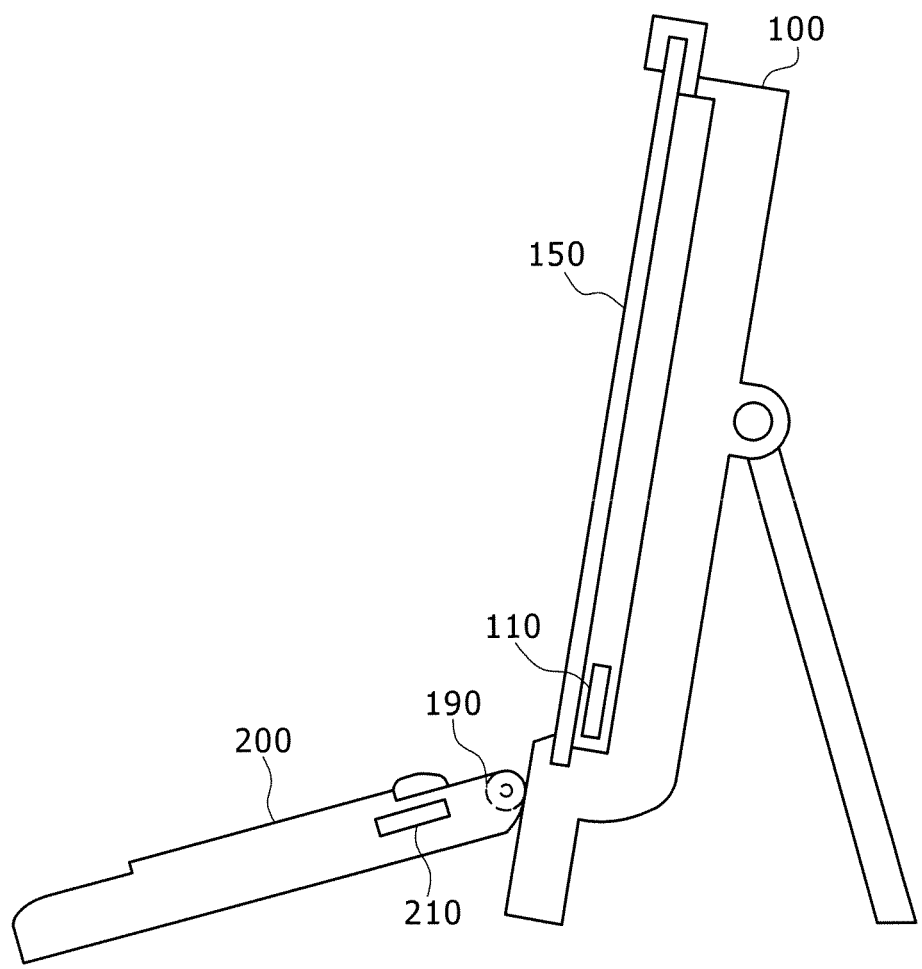
FIG. 5 is a side view illustrating another example of the keyboard as attached to the computer apparatus in the embodiment of the present invention.

FIG. 5 is a side view illustrating another example of the keyboard 200 as attached to the computer apparatus 100 in the embodiment of the present invention. In this example, the keyboard 200 is shown to be unfolded.

With the coil arrangement in this example, the coil 110 of the computer apparatus 100 and the coil 210 of the keyboard 200 are not in proximity with each other when the keyboard 200 is not folded. Therefore, whether or not to perform charging is controlled inevitably according to whether the keyboard 200 is folded, without providing the open/close sensor 180. That is, charging is performed when the keyboard 200 is folded, and not if the keyboard 200 is not folded.

In contrast, if the coil arrangement is changed to permit power transfer at all times irrespective of whether the keyboard 200 is folded, then arbitrary settings are possible using the charging control section 125 as described above. The distance at which power transfer is possible varies depending on the coil capacitance and other factors. Therefore, the coil arrangement need only be determined according to the operating conditions.

Figure 6:
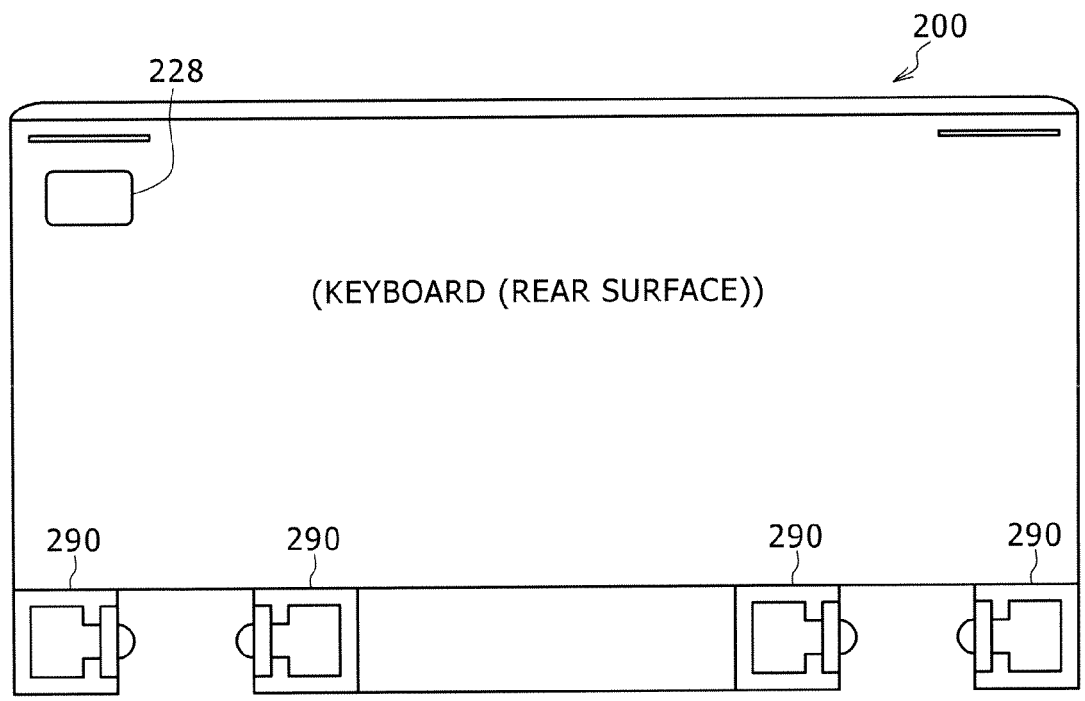
FIG. 6 is a rear view of an example of the keyboard in the embodiment of the present invention.

FIG. 6 is a rear view of an example of the keyboard 200 in the embodiment of the present invention. This surface is exposed to the user's view when the keyboard 200 is folded. Therefore, the product logo may be etched on some part of the rear surface of the keyboard 200. The logo may be designed so that it changes its color or brightness during charging to indicate that charging is in progress. This is not limited to the logo. For example, an indicator lamp 228 to indicate that charging is in progress, for example, may be provided on the rear surface of the keyboard 200.

The keyboard 200 has the attachment sections 290 at one end thereof as described above. Here, a case will be described where plungers are used as the attachment sections 290.

FIGS. 7A and 7B are enlarged views of an example of the attachment sections 290 in the embodiment of the present invention. The attachment sections 290 include plungers. The same sections 290 are attached so as to horizontally sandwich the attachment section 190 of the computer apparatus 100 as illustrated in FIG. 7A.

A plunger 291 has a spring therein. Each of the plungers 291 is arranged so as to push out a protruding portion 292 from the inside to the outside. As a result, the protruding portion 292 can move toward the edge as illustrated in FIG. 7B. When each of the protruding portions 292 engages with a respective recess of the attachment section 190 in such a manner that the same section 190 is sandwiched horizontally between the same portions 292, the attachment section 290 can be attached.

On the other hand, the recesses of the attachment section 190 and the protruding portions 292 have a curved surface. As a result, the attachment section 190 makes up a hinge mechanism which is rotatable around the recesses. This allows the keyboard 200 to rotate around one of its sides as illustrated in FIGS. 4 and 5. It should be noted, however, that the torque generated by the sandwiching force of the plungers is not so large. Therefore, when the keyboard 200 is folded, the attachment is preferably secured with the sheet metals 170 and the magnets 270 illustrated in FIG. 1. It should be noted that no power transfer takes place at the contacts between the attachment sections 190 and 290.

In the embodiment of the present invention, a case has been described where a 'charging' indication is provided on the rear surface of the keyboard 200. However, the present invention is not limited thereto. Instead, for example, a 'charging' indication 151 may be displayed on the display section 150 of the computer apparatus 100 as illustrated in FIG. 8.

Figure 9:
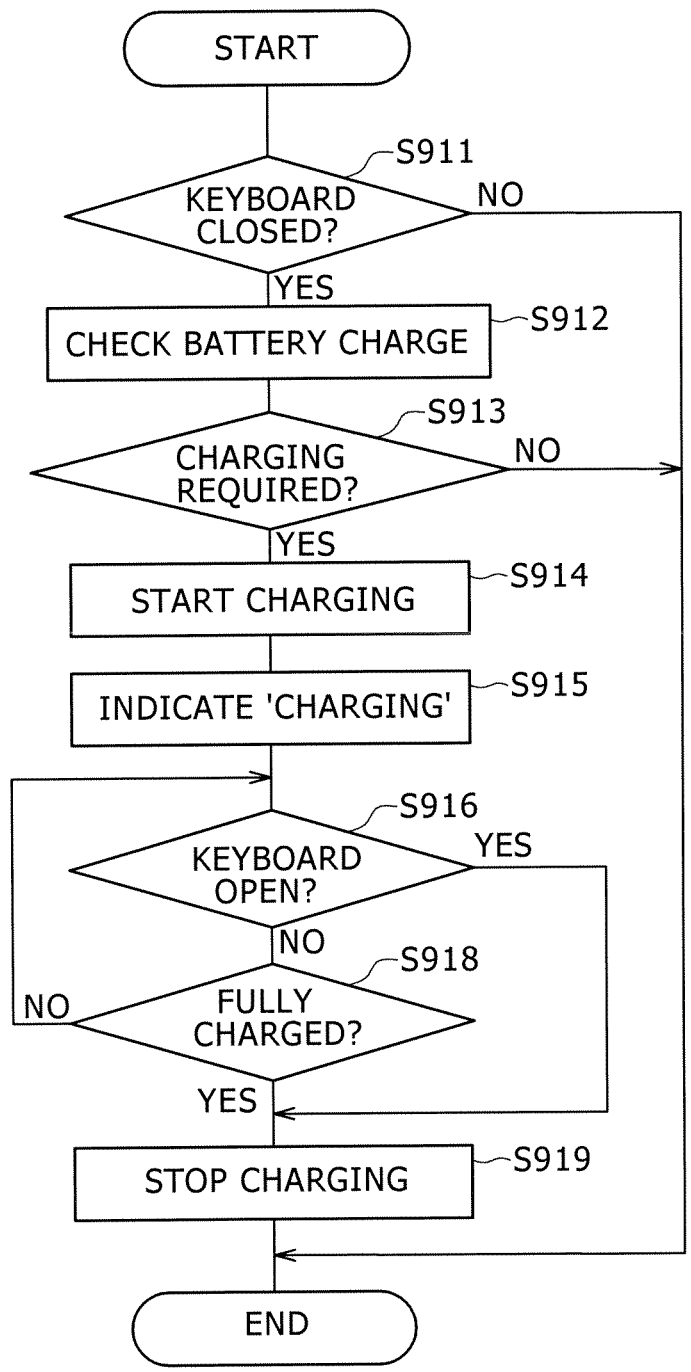
FIG. 9 is a flowchart illustrating an example of process steps for controlling charging in the embodiment of the present invention.

FIG. 9 is a flowchart illustrating an example of process steps for controlling charging in the embodiment of the present invention. Here, a case will be described where charging is performed only when the keyboard 200 is folded (closed).

First, the rotational status of the keyboard 200 is determined. When the keyboard 200 is folded (step S911), the charge of the battery section 220 is checked (step S912). If the battery section 220 needs charging (step S913), the charging starts (step S914). While the charging is in progress, an indication appears on the rear surface of the keyboard 200 or the display section 150 to show that the battery section 220 is being charged (step S915).

Then, when the battery section 220 is charged to a full charge (step S918), the charging thereof stops (step S919). It should be noted that when the keyboard 200 is unfolded (open) during charging (step S916), the charging stops even if the battery section 220 is not charged to a full charge.

Figure 10:
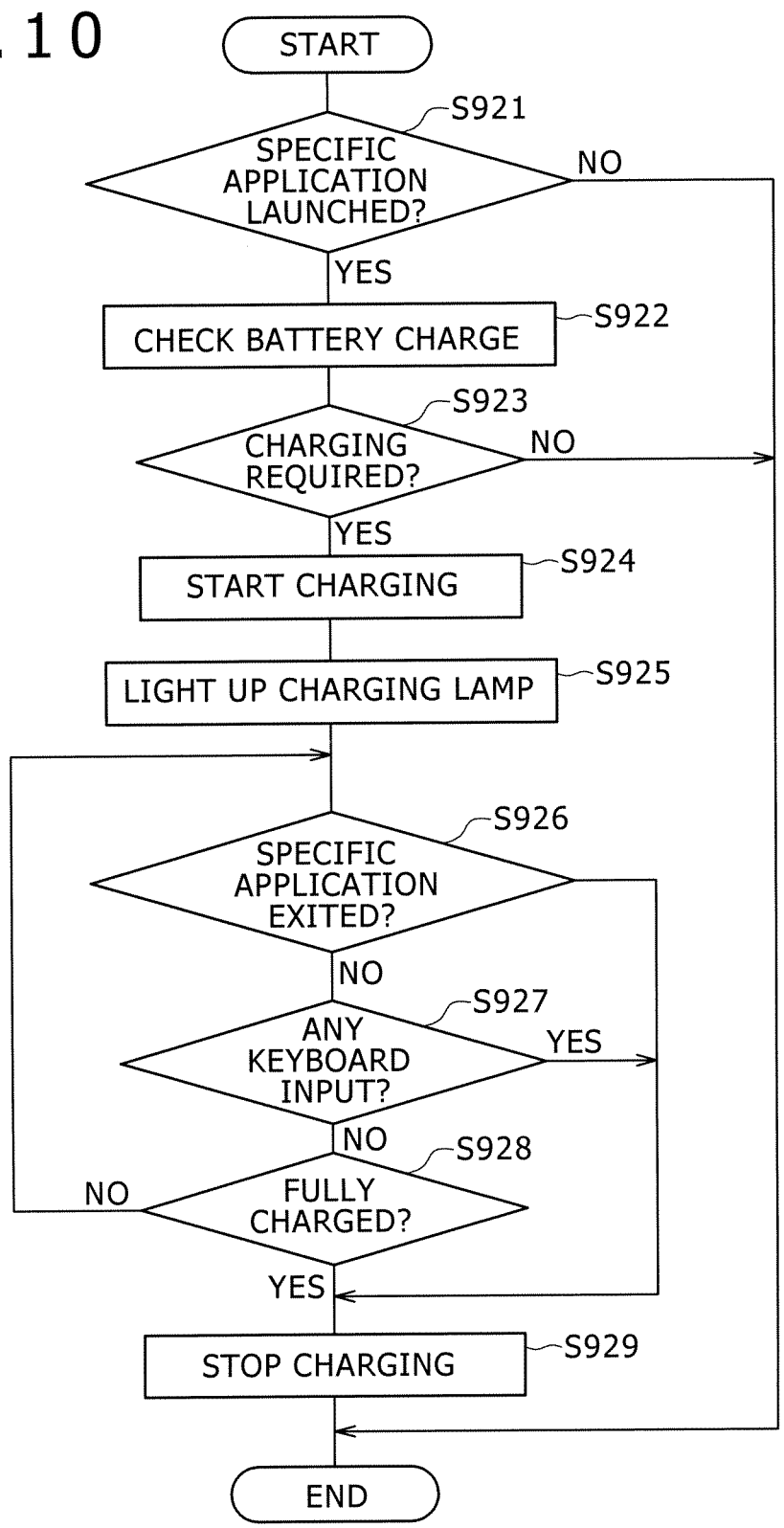
FIG. 10 is a flowchart illustrating another example of process steps for controlling charging in the embodiment of the present invention.

FIG. 10 is a flowchart illustrating another example of process steps for controlling charging in the embodiment of the present invention. Here, a case will be described where charging is performed only when a specific application program is running.

First, it is determined whether or not a specific application program has been launched. If so (step S921), the charge of the battery section 220 is checked (step S922). If the battery section 220 needs charging (step S923), the charging starts (step S924). While the charging is in progress, a charging lamp on the main body of the computer apparatus 100 or the keyboard 200 is lit (step S925). It should be noted that if a specific application program is, for example, DVD reproduction software, a charging, indication displayed on the display section 150 during charging may be detrimental to DVD viewing. Unlike the case illustrated in FIG. 9, therefore, no 'charging' indication is displayed on the display section 150.

Then, when the battery section 220 is charged to a full charge (step S928), the charging thereof stops (step S929). It should be noted that when the specific application program is exited during charging (step S926), the charging stops even if the battery section 220 is not charged to a full charge. It should be noted that when any key input is made from the keyboard 200 (step S927), the charging also stops. This is intended to prevent the charging via the coils from obstructing wireless communication.

In the example illustrated in FIG. 9, the keyboard 200 has to be attached to the computer apparatus 100. In the example illustrated in FIG. 10, however, when the specific application program is DVD reproduction software, it is possible that the charging may be performed even if the keyboard 200 is not attached to the computer apparatus 100.

Figure 11:
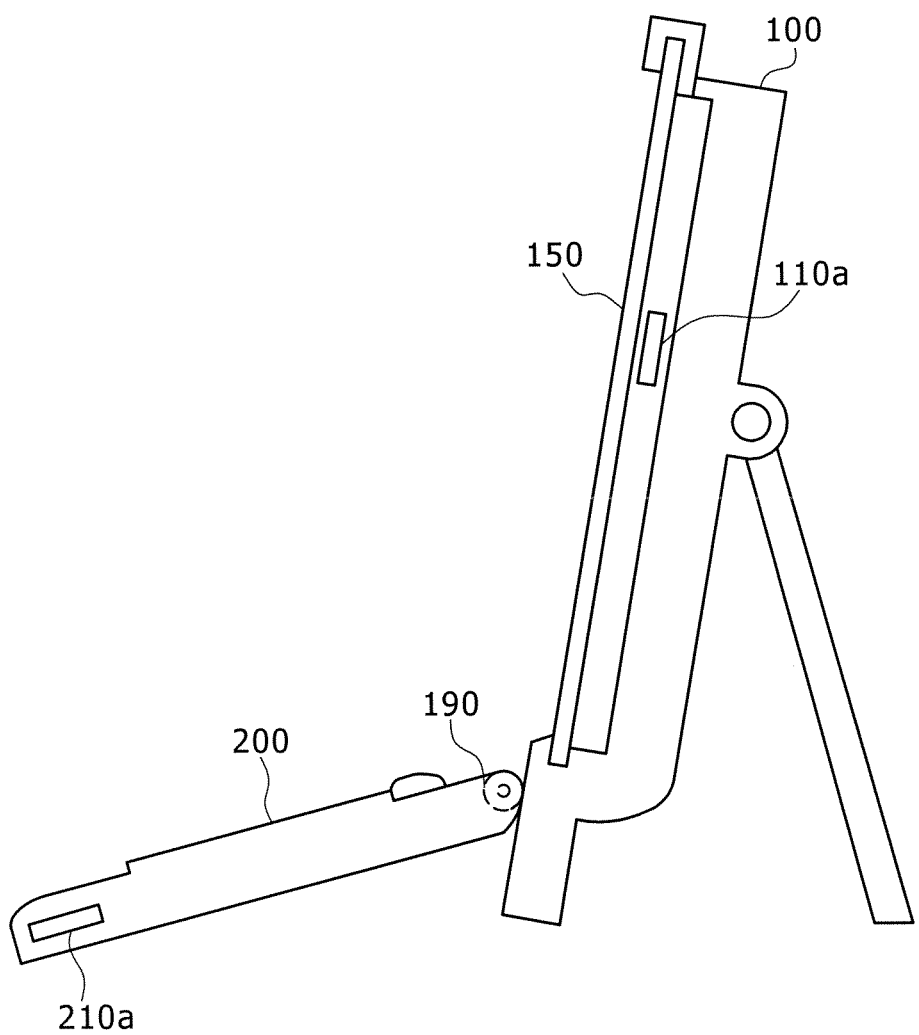
FIG. 11 is a side view illustrating an example of arrangement of coils in the embodiment of the present invention.
Figure 12:
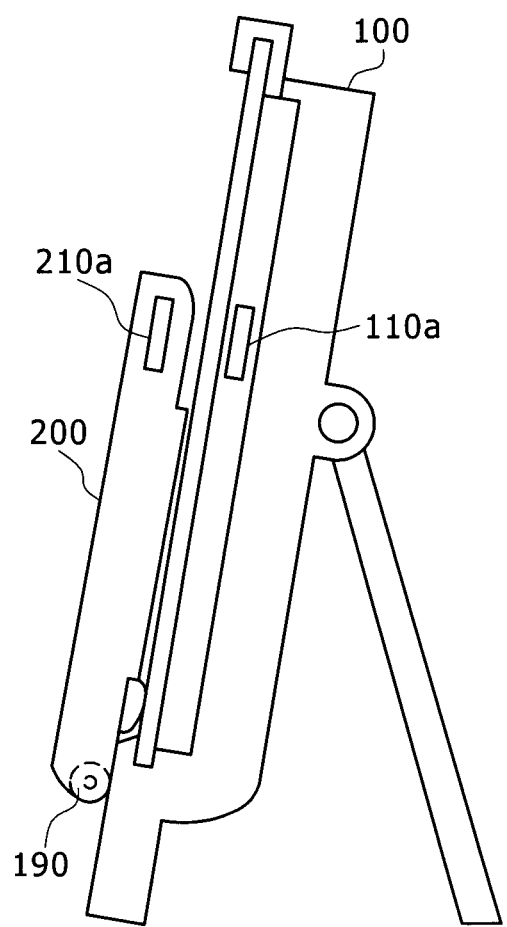
FIG. 12 is a side view illustrating another example of arrangement of the coils in the embodiment of the present invention.

In the embodiment of the present invention, a case has been described where the coils 110 and 210 are arranged in the proximity of the attachment sections 190 and 290 as shown in FIGS. 4 and 5. However, the present invention is not limited to this arrangement. For example, coils 110a and 210a may be arranged far from the attachment sections 190 and 290 as illustrated in FIGS. 11 and 12. In this case, the areas alongside the screen section 150 or other areas can be used.

Thus, according to the present invention, when the attachment sections 290 of the keyboard 200 are attached to the attachment sections 190 of the computer apparatus 100, the keyboard 200 can be charged in a non-contact manner by transferring power from the coil 110 of the computer apparatus 100 to the battery section 220 via the coil 210 of the keyboard 200. The attachment sections 190 and 290 are rotatable by the sandwiching force of the plungers, thus allowing the keyboard 200 to be folded onto the computer apparatus 100. The status of the keyboard 200 can be detected by the open/close sensor 180. This makes it possible to control the charging of the keyboard 200 according to the detection result. Further, depending on the arrangement of the coils 110 and 210, the charging of the keyboard 200 can be controlled according to the status thereof without providing the open/close sensor 180.

It should be noted that the present embodiment is merely an example embodying the present invention. Although there is a correspondence between the components of the present embodiment and those of the appended claims as detailed below, the present invention is not limited thereto, but may be modified in various ways without departing from the spirit of the invention.

That is, in claim 1, a keyboard corresponds, for example, to the keyboard 200. Reception means correspond, for example, to the reception section 130. Attachment means correspond, for example, to the attachment section 190. Power transfer means correspond, for example, to the coil 110. A computer apparatus corresponds, for example, to the computer apparatus 100.

In claim 5, detection means correspond, for example, to the open/close sensor 180.

In claim 8, display means correspond, for example, to the display section 150.

In claim 9, detection means correspond, for example, to the open/close sensor 180. Display means correspond, for example, to the display section 150.

In claim 10, a computer apparatus corresponds, for example, to the computer apparatus 100. Transmission means correspond, for example, to the transmission section 230. A battery corresponds, for example, to the battery 229. Attachment means correspond, for example, to the attachment section 290. Power transfer means correspond, for example, to the coil 210. A keyboard corresponds, for example, to the keyboard 200.

In claim 11, a keyboard corresponds, for example, to the keyboard 200. Reception means correspond, for example, to the reception section 130. Attachment means correspond, for example, to the attachment section 190. Power transfer means correspond, for example, to the coil 110.

What is claimed is:

1. A computer apparatus comprising:
   a wireless interface that receives wireless signals associated with key inputs transmitted from a keyboard;
   an attachment mechanism including first and second attachment sections to attach the keyboard;
   a charging circuit that transfers power in a non-contact manner to a battery incorporated in the keyboard if the keyboard is attached to the computer apparatus;
   a sensor that detects whether the keyboard is folded; and
   a charging control section that controls the charging circuit to transfer the power to the battery when it is detected that the keyboard is folded,
   wherein the charging control section controls the charging circuit to stop transferring the power to the battery when an interrupt condition based on an operation performed at the keyboard is satisfied.

2. The computer apparatus of claim 1, wherein
   the charging control section further controls the charging circuit to transfer the power to the battery according to a keyboard attachment condition.

3. The computer apparatus of claim 1, wherein
   the charging control section further controls the charging circuit to transfer the power to the battery according to a type of a program run by the computer apparatus.

4. The computer apparatus of claim 3, wherein the charging control section further controls the charging circuit to stop transferring the power to the battery when the type of the program run by the computer apparatus is exited.

5. The computer apparatus of claim 4, wherein the charging control section further controls the charging circuit to stop transferring the power to the battery when the type of the program run by the computer apparatus is exited and the battery is not fully charged.

6. The computer apparatus of claim 1, wherein
   the first and the second attachment sections of the attachment mechanism support the keyboard rotatably around a given side of the keyboard,
   the sensor further detects a rotational status of the keyboard, and
   the charging control section further controls the charging circuit to transfer the power to the battery when it is detected that the keyboard is folded, and not if the keyboard is in any other condition.

7. The computer apparatus of claim 1, wherein
   the charging control section further controls the charging circuit to transfer the power to the battery when it is detected that the keyboard is folded, and not if the keyboard is in any other condition.

8. The computer apparatus of claim 1, further comprising:
   an interface that indicates that the battery is being charged while the charging circuit transfers the power to the battery.

9. The computer apparatus of claim 1, wherein the sensor is a magnetic sensor that further detects a magnetic force applied by a magnet included in the keyboard to detect a rotational status of the keyboard.

10. The computer apparatus of claim 1, wherein the charging control section further controls the charging circuit to stop transferring the power to the battery when a wireless signal of the wireless signals is received at the computer apparatus indicating that a key has been pressed at the keyboard.

11. The computer apparatus of claim 1, wherein each of the first and the second attachment sections include a plurality of recess portions.

12. The computer apparatus of claim 11, wherein the plurality of recess portions of said each of the first and the second attachment sections receive a respective spring loaded protrusion portion included in the keyboard.

13. A computer apparatus comprising:
   a keyboard including a battery and a wireless interface that wirelessly transmits signals associated with key inputs;
   a second wireless interface that receives the signals from the keyboard;
   an attachment mechanism including first and second attachment sections to attach the keyboard;
   a charging circuit that transfers power in a non-contact manner to the battery of the keyboard if the keyboard is attached to the computer apparatus;
   a sensor that detects whether the keyboard is folded; and
   a charging control section that controls the charging circuit to transfer the power to the battery of the keyboard when it is detected that the keyboard is folded, wherein the charging control section controls the charging circuit to stop transferring the power to the battery of the keyboard when an interrupt condition based on an operation performed at the keyboard is satisfied.

14. A computer apparatus comprising:
a wireless interface that receives signals associated with key inputs transmitted from a keyboard;
means for attaching the keyboard;
means for transferring power in a non-contact manner to a battery incorporated in the keyboard if the keyboard is attached to the computer apparatus;
means for detecting whether the keyboard is folded;
means for controlling the means for transferring to transfer the power to the battery when it is detected that the keyboard is folded; and
means for controlling a charging circuit to stop transferring the power to the battery when an interrupt condition based on an operation performed at the keyboard is satisfied.

* * * * *